United States Patent [19]

Danan

[11] 4,099,191
[45] Jul. 4, 1978

[54] TELESCOPIC CONVERTIBLE CAMERA

[75] Inventor: Joseph Danan, Kew-Garden, N.Y.

[73] Assignee: Continental Camera Corp., Rahway, N.J.

[21] Appl. No.: 781,006

[22] Filed: Mar. 24, 1977

[51] Int. Cl.² .................. G03B 9/08; G03B 13/02; G03B 9/10
[52] U.S. Cl. .................. 354/226; 354/197; 354/250
[58] Field of Search ......... 354/197, 226, 245, 248, 354/250, 261, 264; 352/142; 355/54

[56] References Cited

U.S. PATENT DOCUMENTS

| 1,789,289 | 1/1931 | Azarraga | 354/197 |
| 2,408,811 | 10/1946 | Resk | 354/248 X |
| 2,896,525 | 7/1959 | Smith | 354/250 |
| 3,558,226 | 1/1971 | Riggs et al. | 355/54 |
| 3,707,118 | 12/1972 | Stoneham et al. | 354/264 |
| 3,720,149 | 3/1973 | Ishizaka et al. | 354/250 UX |
| 3,890,626 | 6/1975 | Ettischer | 354/197 |
| 3,893,135 | 7/1975 | Matsui et al. | 354/197 X |
| 3,893,137 | 7/1975 | Ettischer | 354/197 |
| 4,038,671 | 7/1977 | Schroder et al. | 354/197 |

FOREIGN PATENT DOCUMENTS 116,541  2/1943  Australia ............... 354/250

*Primary Examiner*—Donald A. Griffin

[57] ABSTRACT

In a preferred embodiment, a camera convertible from a camera employing normal-focusing lens for picture-taking, to and from a camera employing telescopic lens, within a unitary housing, having the lens mechanism slidably movable intermittently as desired between the two alternate states, with the lenses shutter mechanism being a structure in fixed position behind the lens, in a predetermined position to alternately block exposing focused light and to transmit exposing focused light to an exposable film posterior to the lens shutter mechanism, the mechanism being a pivoted door structure spring-biased to a closed state of light-blocking function, actuatable intermittently to a light-exposing state by cocked force-exerting member acting through a slip-clutch mechanism.

8 Claims, 12 Drawing Figures

TELESCOPIC CONVERTIBLE CAMERA

This invention relates to a novel combination embodying both a normal camera lens and a telescopic lens and novel shutter mechanism thereof.

BACKGROUND TO THE INVENTION

Prior to the present invention, it has not been possible to compactly embody both normal and telescopic lens for alternate use thereof within a single common housing adaptable for easy and ready use by a person having no special technical skills heretofore necessary for proper use of prior cameras that required the removal of one lens and substitution of another. A substantial and controlling problem has been the lack of space for separate shutter mechanism for the respective lenses, and the lack of space and any suitable mechanism for providing any shutter mechanism posterior to the lenses, such space problem being compounded by the presence of two separate lens mechanisms within the same camera space.

SUMMARY OF THE INVENTION

Accordingly, objects of the invention include the overcoming and/or avoiding of problems and difficulties of the types discussed above, together with the obtaining of other novel advantages and utilities.

In particular, an object is to obtain a camera shutter device operable within limited space of a camera housing embodying two separate lens systems, one of which is telescopic.

Another object is to obtain a camera combination having alternately positionable normal and telescopic lenses, compactly within a common housing, at economically competitive low costs.

Another object is to obtain a camera shutter device as a part of and operable within space of structure not heretofore utilized for shutter mechanism.

Another object is to obtain a camera shutter device operable within remaining space after allowing space for different focal lengths of alternately telescopic and non-telescopic lenses mounted within a common housing compactly.

Other objects become apparent from the preceding and following disclosure.

One or more objects of the invention are obtained by the embodiments illustratively given by way of example as follow, the broader scope of the invention not being limited to these embodiments given merely for improved understanding.

Broadly the invention may be defined as a camera shutter device comprising a door shutter mechanism and a camera mechanism for embodying alternate telescopic and non-telescopic lenses alternately matchable with the door shutter mechanism, within a unified and compact housing structure. Preferably the shutter mechanism includes a slip-clutch mechanism intermittently transmittable of force opening the door of the door shutter mechanism to an open and thereby film-exposing state, and preferably there is an actuation mechanism for the intermittent driving of the slip-clutch mechanism to the exposing open state. In a further preferred embodiment, the door shutter mechanism includes a light barrier in the form of a door structure, mounted to be movable from and to light-blocking positions by associated mechanism. In another preferred embodiment, the door shutter mechanism and light-blocking structure thereof is mounted within through-space of and on tubular light-chnneling conduit structure positioned in juxtaposition to a predetermined film-exposing position, and posterior to a focusing position alternately occupyable by the telescopic and non-telescopic lens, the non-telescopic lens being typically a normal camera lens.

A preferred slip-clutch mechanism includes a lever structure having an inclined plane that terminates in a downward step, and a forwardly-biased and downwardly biased force-exerting member forcefully slidable along the inclined plane to a position of the step behind the lever structure, there being appropriate locking mechanism for locking the force-exerting member in a cocked-state of readiness behind the lever structure, such that when released by the actuation means, the force-exerting member causes the lever structure to move, and thereby causes the barrier to move to a light transmitting state from the light blocking state, intermittently. Spring or other appropriate mechanisms and/or elements bias the force-exerting member both forwardly and downwardly such that it rides up along the inclined plane and downwardly at the step to the position behind the lever structure, and when actuated to a non-locked state, drives the lever structure forwardly, pivotally in a preferred illustrated embodiment.

The shutter mechanism of the present invention is both separate from and positioned posterior to the focusing position that the telescopic and non-telescopic lenses alternately occupy, this being a major and critical feature of the invention, necessary for the compact housing to embody the telescopic and non-telescopic lenses in any practical manner.

THE FIGURES

Figure 3:
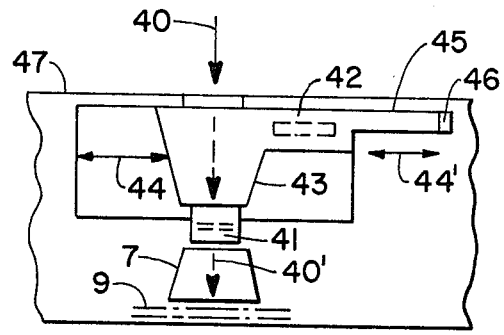

FIG. 3 illustrates diagrammatically the combination of camera structure including slide-structure and alternate positions for telescopic and non-telescopic lenses, and mechanism for the sliding thereof to and fro, to a predetermined film-exposing focusing position anterior to the door shutter mechanism represented merely symbolically in this Figure, the Figure being in typical elevation plan top view.

Figure 4:
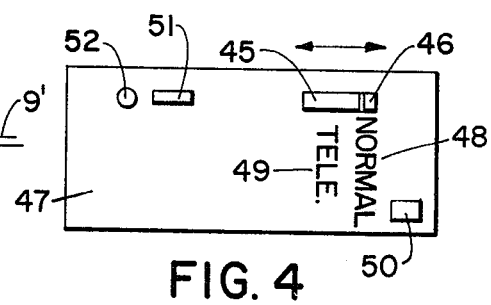

FIG. 4 illustrates a typical camera housing as it appears for the present invention, embodying the invention of the prior figures, and having manual mechanism for switching between the alternate telescopic and non-telescopic position, as might be desired, shown in typical elevation plan view.

Figure 1:
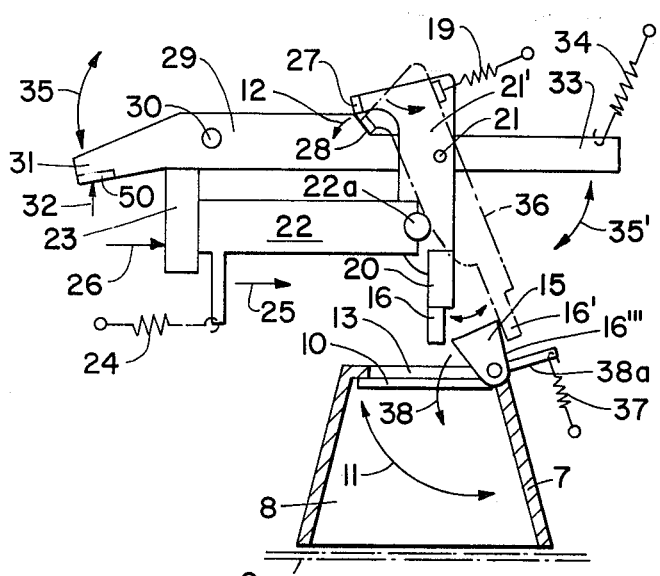
FIG. 1 illustrates a diagrammatic view in top plan view thereof, of a preferred embodiment, illustrating a cocking and a release mechanism, and the door shutter preferred mechanism and structure, with partial cutaway.
Figure 1A:
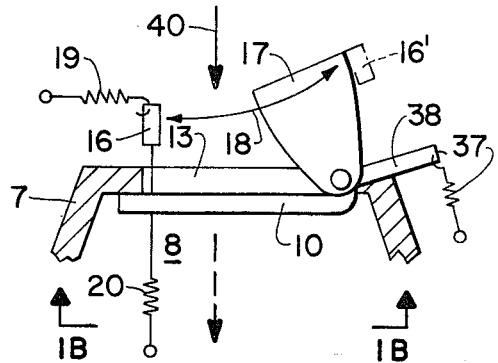
FIG. 1A and FIG. 1C illustrate further details in a further cut-away view of the door shutter mechanism and structure illustrated in FIG. 1.
Figure 1B:
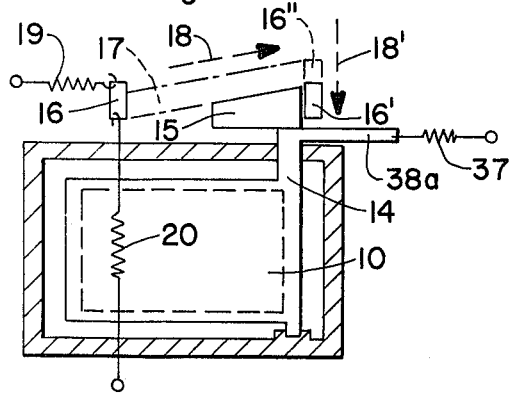
FIG. 1B illustrates a view taken along lines 1B—1B of FIG. 1A, the barrier door being shown in a light-obstructing position and state in FIGS. 1A and 1B, and in an open light-transmiting position and state in FIG. 1C.
Figure 1C:
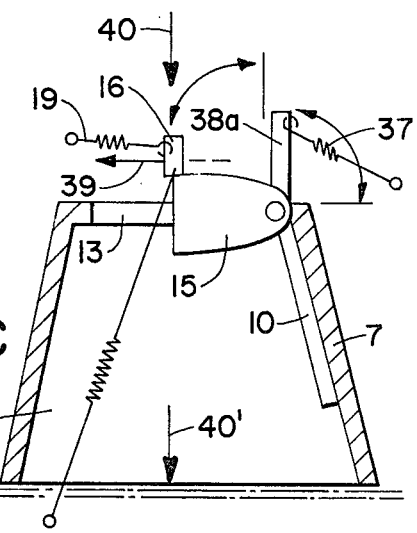
Figure 5:
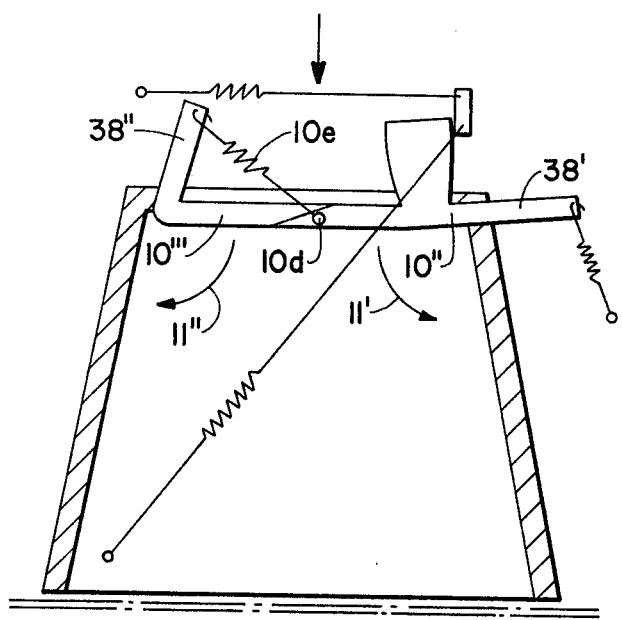
Figure 5A:
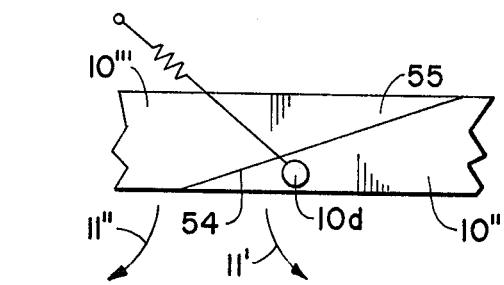

FIG. 5 illustrates in enlarged and diagrammatic view, an alternate shutter door mechanism as a variation on that shown in FIGS. 1A through 1C, having a double-door barrier mechanism. FIG. 5A illustrates an enlargement, diagrammatically, of the overlapping door barriers of the embodiment of FIG. 5.

Figure 2A:
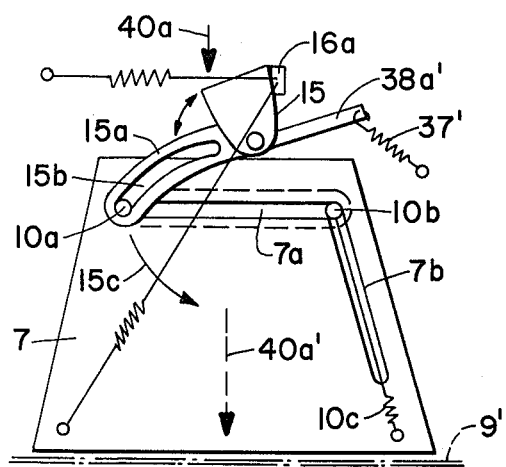
FIGS. 2A and 2B illustrate an alternate embodiment of the door shutter mechanism and structure, in closed-door and open-door positions respectively.
Figure 2B:
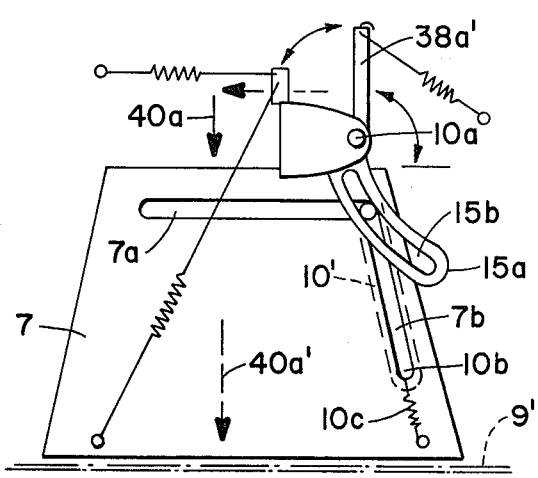
Figure 2C:
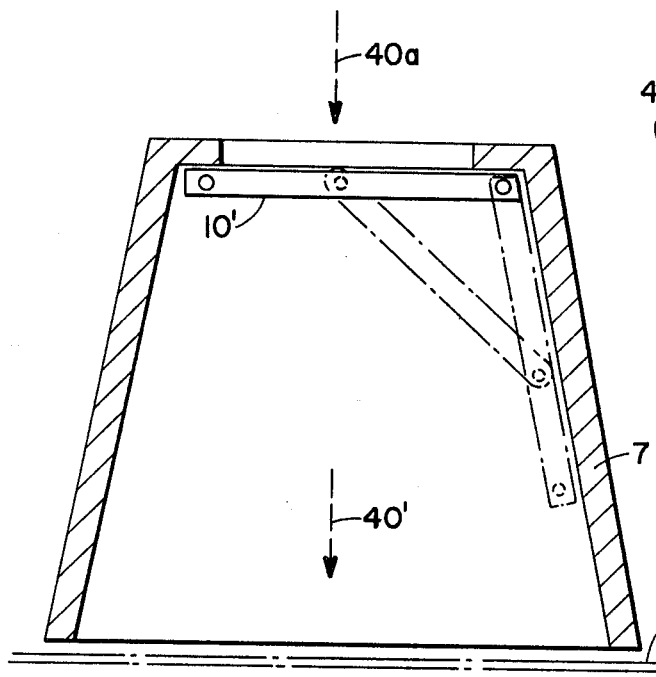
FIG. 2C illustrates a view in partial cut-away, also diagrammatically as FIGS. 2A and 2B, in the closed-door state, but illustrating in phantom the intermediate barrier door positions during the opening and closing thereof,.
Figure 6:
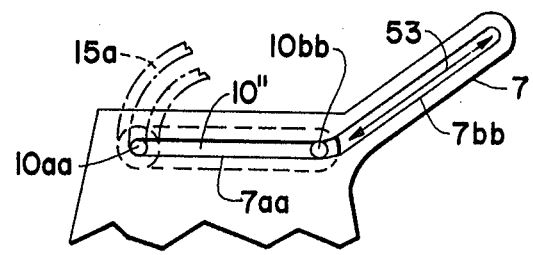

FIG. 6 illustrates an enlarged and in-part view of an alternate embodiment and variation of the FIGS. 2A through 2C embodiment, in top elevation plan view, illustrating another track structure and grooves thereof for a sliding door.

DETAILED DESCRIPTION

All figures are directed to a common camera type, with all elements identical, except to the extent expressly set forth as alternate and/or preferred embodiments as distinguished from other embodiments, elements, etc. illustrated herein.

Accordingly, while FIGS. 1, 1A, 1B, 1C, 3, and 4 are to a preferred composit or combination, the alternate embodiment of FIGS. 2A, 2B, and 2C also are an alternate composit or combination with the otherwise-illustrated elements of FIGS. 1, 3, and 4. Likewise, the embodiment of FIGS. 5 and 5A form a combination with otherwise illustrated components of FIGS. 1, 3, and 4. Likewise, the embodiment of FIG. 6 forms a combination with otherwise illustrated components of FIGS. 1, 3 and 4.

In particular, FIGS. 1, 1A, 1B, 1C, 3 and 4 illustrate as follows.

Channel 8 is formed for the passage of focused light, by the channeling structure 7, the focused light being directed to a point 9 at which undeveloped camera film is normally located at the time of exposure. Exposure is brought about by the opening of the shutter door 10 in pivotal direction 11 within the channel 8, to thereby admit light 40 to become exposing light 40' passing through the port 13 into the channel 8. The door 10 is caused to swing-open by virtue of the lever structure 15 being moved in the pivotal direction 38 as it is pressed forwardly by the force-exerting member 16 as it moves in direction 39 as a result of the biasing spring force of spring 19, the lever structure 15 acting through interconnecting shaft 14. The force-exerting member 16 becomes initially cocked by being forcefully caused to move up the inclined surface 17 in direction 18, to drop downwardly in direction 18' as a drop-off step from the termination of the inclined surface 17; as the force-exerting member 16 moves in direction 18, it does so as a result of a pivot pin 21 causing lock member 27 to becomes biased by spring 19 to a lock position 28 of arm 33 of shutter-release lever 29; spring 34 holds the arm 33 in the locked state until the arm 33 is caused to move in an opposite one of directions 35' as a force in direction 32 moves against the handle member of arm 31 to move arm 31 in direction 35, pivotally on pin 30. The segment on which the FIG. 1 force-exerting member 16 is shown mounted on at the terminal end thereof is a spring-plate which flexes upwardly as the member 16 moves up along the inclined surface, this spring-plate being the spring 20 illustrated in other figures as a mere spring. The manual pressure in direction 26 against button 23 causes the elongated member 22 to act against pin 22 which is fixedly a part of the lever 21' to thereby move the force-exerting member 16 in the direction 18, as elongated member 22 moves in direction 25 against biasing spring 24. Thus, the force-exerting member 16 becomes cocked and locked at position 36, for the member shown as 16', after it drops from position 16", to rest against the rear surface 16'" of lever structure 15, which is biased rearwardly by biasing spring 37 acting on projection 38a.

In FIG. 3 the FIG. 4 camera 47 is illustrated in an in-part view, with the housing removed, diagrammatically, to illustrate a normal lens structure 41 and a telescopic lens structure 42 as a part of a unitary structure 43 slidable in to and fro directions 44 by movement in directions 44' of the lever arm 45 by handle 46, to and from positions for focusing the light 40 through channeling structure 7, for the respective indicia-indicated positions "Normal" 48 and "Tele." 49. Pressure on button 50 trips the release of the arm 33 and lock member 27 from lock position 28, whereby the door 10 is flipped intermittently open and immediately thereafter closes to shut, again. On-off switch is illustrated as switch member 51, and flash-ready light 52 is conventional as an indicator that necessary electrical charge has been built-up for operating the flash bulb.

The embodiment of FIGS. 5 and 5A substantially corresponds in all matters to the embodiment of FIGS. 1A, 1B, and 1C, except for the employment of two doors, which thereby has the advantage of even exposure from the center toward each of the opposides of the film frame as a result of central light being first admitted, followed by widening in each direction. This is in contract to the longer exposure of one edge in particular by the single-door exposure. Accordingly, the second door 10'" receives its pivoting force through interconnecting link member 10e which is preferably a spring, leakage of light between the meeting edges of the doors being prevented by the overlapping door-edges 54 and 55, the doors swinging in directions 11' and 11" respectively to open, spring 10'" being anchored on a projection 10d.

The embodiment of FIGS. 2A, 2B, and 2C differs in that a sliding door is utilized, the door having keys 10a and 10b at opposite ends thereof riding in grooves (slots) 7a and 7b of the channeling structure 7, preferably with a biasing spring 10c to assure rearward movement when the door is being opened, for the key 10b as shown in FIG. 2B. Opening movement is caused by the key 10a riding also in the slot 15b of slotted lever 15a as it moves in direction 15c to the FIG. 2B position. The FIG. 2C illustrates the closed position, and in phantom the intermediate and open positions of the door 10'. The other parts have been numbered to correspond with identical parts already described for prior embodiments.

The embodiment of FIG. 6 differs only from that of the FIGS. 2A, 2B, and 2C, in that there is provided a substantially laterally-directed groove projection 7x having groove 7bb for movement of key 10bb in direction 53, the slotted lever 15a being shown only in phantom in this view.

It is within the scope of the invention to make such variations as would be apparent to a person of ordinary skill, including the substitution of obvious equivalents.

I claim:

1. A camera shutter device comprising in combination: camera-works enclosure structure forming space therein substantially enclosed as an enclosed space; said camera-works enclosure structure being of a predetermined small size, and said enclosed space being a predetermined small space; camera lens means for alternately moving separate lenses of different focal lengths to and fro laterally to and from picture-taking position, including a first lens unit having a lens of normal focus and a second lens unit having a lens of telescopic lens focus, the camera lens means being mounted within a forward portion of said predetermined small space and adapted to receive light and to focus the light rearwardly substantially; door shutter means for channeling light from a camera lens to light-sensitive film, and for open and closing a door structure blocking light transmission when in a closed state, adapted to serve as a camera shutter for taking pictures by intermittent motion when actuated to a light-transmitting state, fixedly mounted on said camera-works enclosure structure within a rearward portion of said predetermined small space at a point rearward of the camera lens means and in juxtaposition to a rearward wall of the camera-works enclosure structure as a film light-receiving and exposing position, the door shutter means including a slip-clutch means for intermittently transmitting force to opening to a light-transmitting state; actuation means for intermittently driving said slip-clutch means to the light transmitting state; said door shutter means including a light barrier as the door structure, mounted to be moved to and from light-blocking positions by said actuation means, and the door shutter means further including a tubular light-channeling conduit-structure positioned in juxtaposition to the light-receiving and exposing position, and said light barrier being mounted within said tubular light-channeling conduit and adapted to be moved therewithin to and from the light-blocking positions.

2. A camera shutter device of claim 1, in which said door shutter means includes a tubular light-channeling conduit-structure, and said slip-clutch means being mounted on the tubular light-channeling conduit adapted for intermittently permitting light to be transmitted through said through-passage space of the tubular light-channeling conduit structure to said film light-receiving and exposing position.

3. A camera shutter device of claim 2, including lens means for alternately positioning and providing telescopic lens and non-telescopic lens in light-focusing and transmitting state and position anterior to said door shutter means, at a forward end of through-space of the tubular light-channeling conduit-structure.

4. A camera shutter device of claim 1, in which the slip-clutch means comprises a lever structure mounted on the light barrier for moving the light barrier from and to the light-blocking positions when activated, and the lever structure including an inclined plane terminating in a step, and the slip-clutch means further including a movable force-exerting member mounted on and movable by the actuation means, the force-exerting member being positioned to be moved from a non-force-exerting position upwardly along said inclined plane and downwardly at said step at a position behind the lever structure, and a spring means for biasing the force-exerting member downwardly at said step position to the position behind the lever structure, and actuation means including locking means for intermittently locking the force-exerting member in said position behind the lever structure in a non-force-exerting member in said position behind the lever structure in a non-force-exerting state and for manual release to a force-exerting state against a rearward wall of the lever structure, and the actuation means further including setting means for advancing the force-exerting member along said inclined plane and downwardly to the position behind the lever structure.

5. A camera shutter device of claim 4, including lens means for alternately positioning and providing telescopic lens and non-telescopic lens in light-focusing and transmitting state and position anterior to said door shutter means, at a forward end of through-space of the tubular light-channeling conduit-structure.

6. A camera shutter device of claim 1, including lens means for alternately positioning and providing telescopic lens and non-telescopic lens in light-focusing and transmitting state and position anterior to said door shutter means, at a forward end of through-space of the tubular light-channeling conduit-structure.

7. A camera shutter device of claim 1, including lens means for alternately positioning and providing telescopic lens and non-telescopic lens in light-focusing and transmitting state and position anterior to said door shutter means.

8. A camera shutter device comprising in combination: a camera means including lens means for alternately positioning between to to fro transversly lateral positions relative to a predetermined focusing point receivable of light-receiving and exposable picture film; and a door shutter means for alternately blocking focused light to the predetermined focusing point, positioned posterior to and separated from the lens means, said camera means being for the alternate taking of telescopic and non-telescopic pictures, and said door shutter means including a light barrier and a tubular light-channeling conduit-structure positioned in juxtaposition to the light-receiving and exposing position, and the light barrier being mounted within said tubular light-channeling conduit and adapted to be moved therewithin to and from the light-blocking positions.

* * * * *